(12) United States Patent  (10) Patent No.: US 8,958,194 B2
Cerny et al.  (45) Date of Patent: Feb. 17, 2015

(54) SURGE PROTECTOR

(75) Inventors: Joachim Cerny, Bielefeld (DE);
Thomas Meyer, Ottenstein (DE);
Rainer Durth, Horn-Bad Meinberg (DE)

(73) Assignee: Phoenix Contact GmbH & Co. KG., Blomberg (DE)

(*) Notice: Subject to any disclaimer, the term of this patent is extended or adjusted under 35 U.S.C. 154(b) by 0 days.

(21) Appl. No.: 13/428,865

(22) Filed: Mar. 23, 2012

(65) Prior Publication Data

US 2012/0243138 A1 Sep. 27, 2012

(30) Foreign Application Priority Data

Mar. 23, 2011 (DE) .................. 10 2011 001 509

(51) Int. Cl.
*H02H 9/04* (2006.01)
(52) U.S. Cl.
CPC ................ *H02H 9/041* (2013.01); *H02H 9/04* (2013.01); *H02H 9/042* (2013.01); *H02H 9/048* (2013.01)
USPC ........................... 361/112; 361/106; 361/93.9
(58) Field of Classification Search
CPC .......... H02H 9/04; H02H 9/042; H02H 9/048
USPC ........................................ 361/112, 93.9, 106
See application file for complete search history.

(56) References Cited

U.S. PATENT DOCUMENTS

| 4,023,071 | A | * | 5/1977 | Fussell | ............................. 361/56 |
| 4,630,163 | A | * | 12/1986 | Cooper et al. | .................. 361/56 |
| 4,675,772 | A | | 6/1987 | Epstein | |
| 5,969,928 | A | * | 10/1999 | Hashimoto et al. | ........... 361/106 |
| 7,787,230 | B2 | * | 8/2010 | Michalopoulos et al. | ..... 361/112 |
| 2004/0051622 | A1 | * | 3/2004 | Banich et al. | ............... 338/22 R |
| 2005/0243495 | A1 | | 11/2005 | Ramarge et al. | |
| 2007/0223171 | A1 | | 9/2007 | Guy et al. | |
| 2008/0310072 | A1 | | 12/2008 | Michalopoulos et al. | |
| 2010/0328832 | A1 | * | 12/2010 | Hasunuma et al. | .......... 361/93.8 |
| 2013/0222958 | A1 | * | 8/2013 | Fu et al. | ....................... 361/91.1 |

FOREIGN PATENT DOCUMENTS

| CN | 1127922 A | 7/1996 |
| CN | 1695210 A | 11/2005 |
| CN | 101238535 A | 8/2008 |
| DE | 24 05 671 A1 | 8/1975 |
| DE | 195 03 237 A1 | 8/1996 |
| WO | 9003681 A1 | 4/1990 |

(Continued)

OTHER PUBLICATIONS

McLynn, The Simple Fuse, 2008, IEEE Reliability Society Annual Technology Report, p. 1.*

(Continued)

*Primary Examiner* — Zeev V Kitov
(74) *Attorney, Agent, or Firm* — Ohlandt, Greeley, Ruggiero & Perle, LLP

(57) ABSTRACT

A surge protection device (SPD) includes a spark gap (SG) and in series to the spark gap (SG) a temperature-dependent resistance element (R) with positive temperature coefficient, wherein the spark gap (SG) has a certain holding current, wherein the resistance element (R) is sized such that when a switching temperature is reached, the current is limited such that the holding current of the spark gap is undercut and is switched off, and wherein the resistance element is sized such that in the case of a transient event, the switching temperature is not reached.

18 Claims, 2 Drawing Sheets

(56) References Cited

FOREIGN PATENT DOCUMENTS

| WO | WO 90/03681 | * | 5/1990 | ............... | H02H 9/04 |
| WO | WO 2011041929 | | 4/2011 | | |

OTHER PUBLICATIONS

Chinese Office Action dated Aug. 15, 2014 for corresponding Chinese Application No. 201210092200.5, 10 pages.

* cited by examiner

SURGE PROTECTOR

FIELD

The following description relates generally to electrical equipment, and more particularly to a surge protection device.

BACKGROUND

One type of surge protection devices are typically used on sensitive power mains. These surge protection devices must divert most of the power of a transient event, also referred to as an overvoltage event. These transient events include, for example, lightning strikes. Transient events typically take place in the time range of <1 ms. Normatively, this type of transient event is modeled, for example, as a reference surge current with a 10/350 µs wave shape profile in the kA range.

For use as a surge protection device, as a rule varistors and/or spark gaps are used. However, with these varistors or spark gaps a grid follow current also occurs, which is caused by a low impedance discharge path. However, a surge protection device is also used to prevent or limit and switch off this grid follow current without a backup fuse of the surge protection device or the installation to be protected being triggered.

Conventional spark gaps have a low arc burning voltage and are not therefore able to control grid follow currents. These conventional spark gaps are extinguished in the alternating voltage passing through zero (mains voltage) and trigger a backup fuse, however, and in particular in the case of use on powerful electric mains. Nevertheless, this spark gap technology has the advantage that the components are very powerful. Thus commercially available products make it possible to divert surge currents up to 50 kA.

An improvement in the ability to extinguish grid follow current is provided by spark gaps with arc splitter chambers on the basis of arc multiplication. However, these have the problem that hot ionized gases are blown out in an explosive manner.

Another improvement of the ability to extinguish grid follow current is provided by encapsulated spark gaps in pressure-resistant housings. With these encapsulated spark gaps the arc voltage is raised into the range of the mains voltage by a pressure buildup in the spark gap and a grid follow current development is thus suppressed.

However, a grid follow current can develop at the end of a transient event, when the surge current is no longer sufficient to maintain the pressure and thus the arc voltage. That is, the grid follow current cannot be reliably switched off. In addition, encapsulated spark gaps have large electrode spacings, with which a poorer reaction behavior is associated compared to "simple" spark gaps.

In another technical field, namely, telecommunications, positive temperature coefficient devices ("PTCs") are used in combination with gas discharge tubes in overvoltage protection. However, this is a field of application of overvoltage protection in which no high electric power is available on the part of the mains. In overvoltage protection PTCs are used for the current limiting of long-lasting faults, that is faults that last much longer than transient events, i.e., >>1 ms. The PTCs used there have ohmic resistances of more than 1 ohm and are able to carry rated currents in the range of a few amperes. Due to the low powers, these ohmic resistances of the PTCs used do not represent a major problem at switchgear cabinet temperature.

The manufacturers in this field of technology are thereby endeavoring to render possible current densities that are as high as possible with low volumes, in order to reach low W/R values or $i^2t$ values (specific energy or joule integral) up to the switching threshold of the PTC.

Accordingly, an object of the presently disclosed embodiments is to provide an improved surge protection device which has the advantages of a spark gap arrangement for the surge protection and an improved grid follow current extinction behavior. Another object is furthermore to avoid the unnecessary triggering of an existing backup fuse of the arrangement.

SUMMARY

These objects, and others, are attained according to the embodiments disclosed below.

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a surge protection device (SPD) includes a spark gap (SG) and in series to the spark gap (SG) a temperature-dependent resistance element (R) with positive temperature coefficient. The spark gap (SG) has a certain holding current, and the resistance element (R) is sized such that when a switching temperature is reached, the current is limited such that the holding current of the spark gap is undercut and is switched off. The resistance element is also sized such that in the case of a transient event, the switching temperature is not reached.

For heating the resistance element in the transient overvoltage case, the necessary specific energy $i^2(t)_{R, Switch}$ for achieving the switching temperature is selected larger than the joule integral of $i^2(t)_{Transient}$ of the transient.

In some embodiments, the surge protection device may be a surge protection device of class 1, 2 or 3 pursuant to IEC61643. The transient overvoltage may be a reference current surge with pulse shape of 10/350 µs, and the reference current surge may be 10 kA or more with pulse shape of 10/350 µs.

The resistance of the resistance element at room temperature may be less than or equal to 100 mΩ. The specific energy $i^2(t)_{R, Switch}$ for achieving the switching temperature may be greater than 100 $A^2s$, and in particular greater than 1000 $A^2s$, particularly preferably greater than 100 $kA^2s$. The specific energy $i^2(t)_{R, Switch}$ for achieving the switching temperature may be less than 1 $MA^2s$, and in particular less than 900 $kA^2s$.

The surge protection device may furthermore include a backup fuse (F1) which is arranged in series to the resistance element (R) or the spark gap (SG). The resistance element may be sized such that during the heating of the resistance element in the transient overvoltage case the necessary specific energy $i^2(t)_{Transient}$ and the specific energy $i^2(t)_{Powergrid}$ of a grid follow current together is lower than the specific energy $i^2(t)_F$ which would be necessary for melting the fuse.

In some embodiments, the switching temperature is 80° C. or more, for example 100° C., and in particular 140° C. The starting resistance of the resistance element may be selected such that the sum of the voltages applying in case of discharge at the resistance element, the spark gap and the fuse does not exceed a voltage of 4500 V, preferably 1500 V, particularly preferably 1000V.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
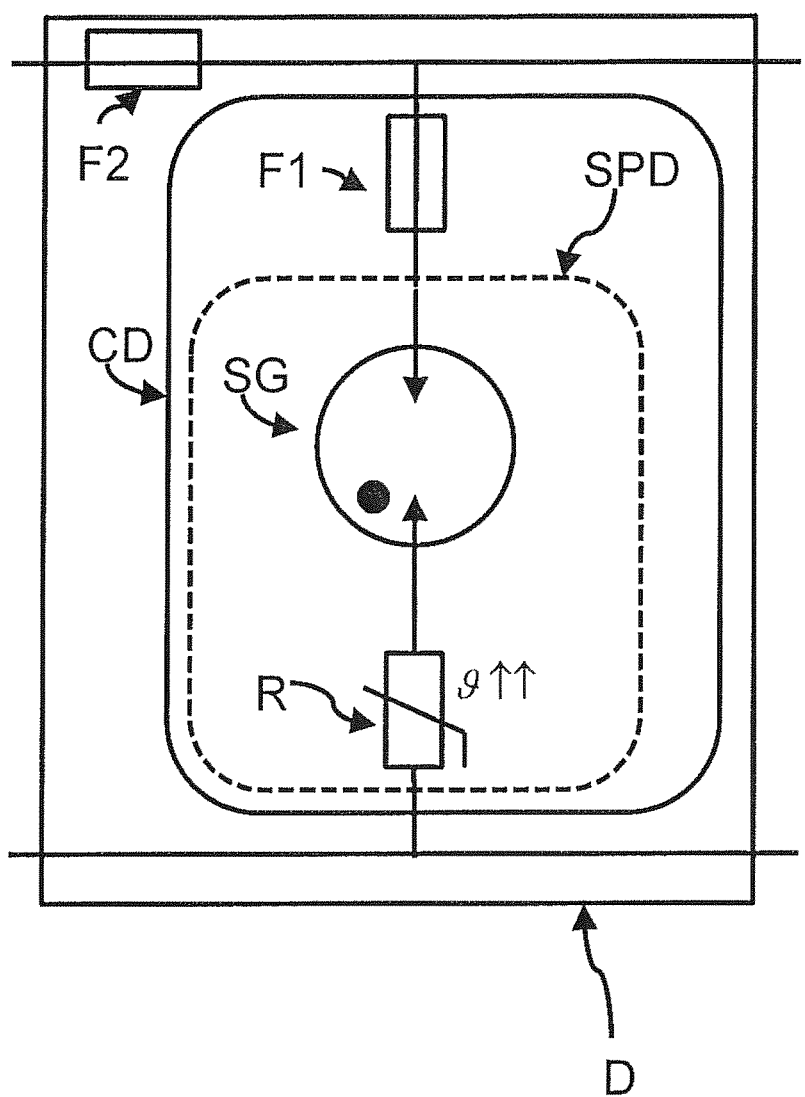
FIG. 1 is a diagrammatic arrangement inside a surge protection device according to one embodiment of the present invention.
Figure 2:
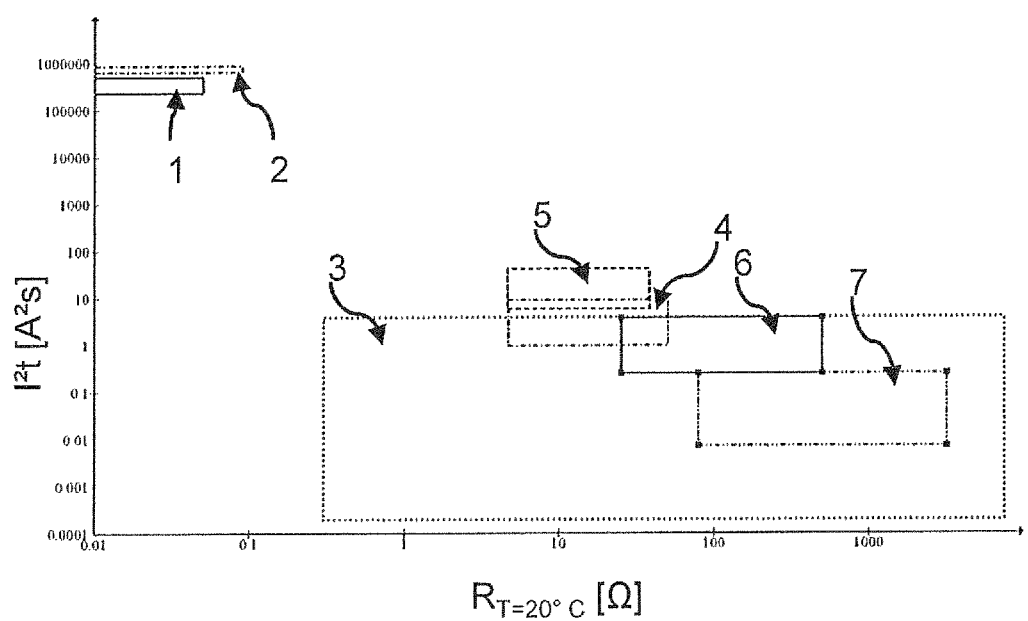
FIG. 2 shows a range classification of PTCs for use in a surge protection device according to one embodiment of the present invention.

In one aspect of the disclosed embodiments shown in FIGS. 1-2, a surge protection device SPD has a spark gap SG and in series to the spark gap SG a temperature-dependent resistance element R with positive temperature coefficient. The spark gap SG has a specific holding current. The resistance element R is on the one hand sized such that when a switching temperature is reached, the current is limited such that the holding current of the spark gap is undercut and is switched off. On the other hand, the resistance element R is sized such that in the case of a transient event, the switching temperature is not reached.

Due to this embodiment on the one hand the protection against transient events is rendered possible by the use of efficient spark gaps SG, on the other hand, however, by the use of a suitably sized resistance element R, the grid follow current extinction ability is ensured.

Furthermore, a backup fuse F1 can be arranged in the discharge path and/or a backup fuse F2 can be arranged in the working path. The installation location of the backup fuse F1, F2 is dependent on the particular application.

When a transient event occurs, e.g., a surge current, the resistance element R is cold and thus conductive. The spark gap SG ignites with the action of the transient event, wherein the ignition of the spark gap SG can also be triggered externally. Now the arrangement diverts the surge current and first of all the resistance element R remains low-impedance (<<1 ohm). However, if a grid follow current should develop that cannot be extinguished by the spark gap SG, the resistance element R is heated by the power dropping at it $P = U_R \cdot I_{Powergrid}$ up to the switching temperature $T_{switch}$ and limits the current to an uncritical value.

This grid follow current can then be switched off by a following voltage passing through zero or by undercutting the holding voltage of the spark gap SG. The extinguishing of the spark gap SG is caused hereby and the starting condition is reestablished. Subsequently, the resistance element R cools down independently and thereby becomes low-impedance again. The resistance element R is sized such that to heat the resistance element R in the transient overvoltage case (switch), the necessary specific energy $i^2(t)_{R,Switch}$ for achieving the switching temperature is selected larger than the joule integral $i^2(t)_{Transient}$ of the transients. In other words, the resistance element R must be sized such that due to the energy input during the surge current discharge, which leads to an increase in temperature $\Delta T_{Transient}$ compared to the rest temperature $T_0$, it does not heat to the switching temperature $T_{switch}$.

This can be represented mathematically as follows:

$$T_0 + \Delta T_{transient} < T_{Switch}$$

The rest temperature $T_0$ is thereby not necessarily room temperature or a standard temperature (e.g., 20° C.) but can also be atypical temperature that prevails in an equipment cabinet, e.g. 60° C. or also 80° C. or more, depending on the location and the switching temperature.

Due to the additional energy input of a possibly occurring grid follow current, which leads to an increase in temperature $\Delta T_{Powergrid}$, the resistance element R can be further heated to above the switching temperature $T_{switch}$ and thereby increases its resistance. The switching temperature is thereby, for example, 80° C. or more, preferably 100° C., particularly preferably 140° C. As a result, the current is limited until the spark gap SG is extinguished or a zero current of the mains voltage occurs.

This can be represented mathematically as follows:

$$T_{Switch} \leq T_0 + \Delta T_{Transient} + \Delta T_{Powergrid}$$

From this a total concept regarding the temperature can be represented as follows:

$$T_0 + \Delta T_{transient} < T_{Switch} \leq T_0 + \Delta T_{Transient} + \Delta T_{Powergrid}$$

The necessary specific energy, also referred to below as joule integral i2tR,Switch, which heats the resistance element R from its rest temperature $T_o$ to switching temperature $T_{switch}$, is thereby greater than the joule integral of the transient i2tTransient in order to prevent a surge from heating the resistance element R up to the switching temperature $T_{switch}$.

This can be represented mathematically as follows:

$$i^2 t_{Transient} < i^2 t_{R,Switch}$$

$i^2 t_{Transient}$ thereby designates the specific energy in the current path through transients and $i^2 t_{R,Switch}$ the specific energy quantity at the resistance element R for achieving the switching temperature. The specific energy $i^2 t_{R,Switch}$ for achieving the switching temperature is preferably greater than 100 A²s, in particular greater than 1000 A²s, particularly preferably greater than 100 kA²s.

Furthermore, the sum of the specific energies from the transient $i^2 t_{Transient}$ and the grid follow current $i^2 t_{Powergrid}$ is greater than the specific energy of the switching temperature $i^2 t_{R,Switch}$ so that the resistance element R is heated by a grid follow current to or above the switching temperature $T_{switch}$.

This can be represented mathematically as follows:

$$i^2 t_{R,Switch} < i^2 t_{Transient} + i^2 t_{Powergrid}$$

$i^2 t_{Powergrid}$ thereby designates the specific energy in the current path due to grid follow current. The specific energy $i^2 t_{R,Switch}$ for achieving the switching temperature is preferably less than 1 MA²s, in particular less than 900 kA²s.

The above-referenced sum of the specific energies of transient $i^2 t_{Transient}$ and grid follow current $i^2 t_{Powergrid}$ should not exceed the fusing integral $i^2 t_F$ of a possibly present backup fuse F1, F2.

This can be represented mathematically as follows:

$$i^2 t_{Transient} + i^2 t_{Powergrid} < i^2 t_F$$

$i^2 t_F$ thereby designates the fusing integral of the backup fuse F1, F2, this value is typically specified by the manufacturer of the fuse.

From this a total concept regarding the specific energies $i^2t$ can be represented as follows:

$$i^2t_{Transient} < i^2t_{R,Switch} < i^2t_{Transient} + i^2t_{Powergrid} < i^2t_F$$

$i^2t_F$ thereby designates the fusing integral of the backup fuse F1, F2, this value is typically specified by the manufacturer of the fuse.

From this a total concept regarding the specific energies $i^2t$ can be represented as follows:

$$U_R + U_{SG} + U_F \le U_P$$

For example, the starting resistance of the resistance element R is selected such that the sum of the voltages applying in case of discharge at the resistance element $U_R$, the spark gap $U_{SG}$ and the fuse $U_F$ does not exceed a voltage $U_P$ of 4500 V, preferably 1500 V, particularly preferably 1000V.

From this a condition can be derived for a maximum starting resistance $R_{max}$, which must not be exceeded before the switching temperature $T_{switch}$ has been reached.

$$R_{max} = \frac{U_R}{I} < \frac{U_P - (U_{SG} + U_F)}{I}$$

Furthermore, the starting resistance of resistance element R must not be zero either, since otherwise no heating can take place at the resistance R. From this a condition can thus be derived for a minimum starting resistance $R_{min}$:

$$0 < R_{min}$$

Thus the starting resistance of the resistance element R at room temperature can be less than or equal to 100 mΩ.

From this a total concept can be derived with regard to the specific energies $i^2t$ as follows:

$$R_{min} < R \le R_{max}$$

Due to the invention it is possible to provide a surge protection device SPD of the category class 1, 2 or 3 pursuant to IEC61643.

These surge protection devices SPD are thereby able in the installed condition to easily divert a transient event, e.g., an overvoltage, which corresponds to a reference voltage surge 10/350 µs $i_{Transient}$ and to thereby extinguish a grid follow current $i_{Powergrid}$. If a backup fuse F1, F2 is present in the installed condition, this is prevented from melting through.

The surge protection devices SPD are thereby able to safely divert reference current surges $i_{Transient}$ of 10 kA, 20 kA, 30 kA or more of the pulse shape 10/350 µs.

Depending on the design of the surge protection devices SPD, the limited current after the switching temperature $T_{switch}$ has been reached is less than or equal to I=315 A.

Based on the dimensions shown above, at this point this sizing will be described by way of example for two typical fields of application:

Example Power Supply:

Based on a typical type 1 application in surge protection in the European grid (e.g. 230V or the like), commercially available surge protection devices SPD should be able to divert 30000 A surge current of the pulse shape 10/350 µs. The manufacturers specify a required backup voltage F1, F2. With comparable commercially available applications this is e.g. I=315 A rated current carrying capacity.

The rated resistance range of the applicable resistance elements R is determined by the maximum permissible protection level $U_P$ of the application, which has an upper limit set by the insulation coordination. This highest permissible protection level is 4000 V. However, commercially available products already provide protection levels of 1500 V. In the peak value of the surge current, the largest current drop is to be expected at the PTC. The resistance element R is sized such that the resistance has not yet undergone any appreciable change in resistance.

The resistance of the resistance element $R_{max}$ therefore must not exceed:

$$R_{max} = \frac{1500 \text{ V}}{30 \text{ kA}} = 50 \text{ m}\Omega$$

A surge protection device SPD of this type would require, for example, a 315 A fusing backup fuse F1, F2, which has a fusing integral of approx. $i^2t_F = 513000 \text{ A}^2\text{s}$. This size is the maximum size of the specific energy $i^2t_{R,Switch}$ that can be used in order to heat the resistance element R from its rest temperature $T_0$ to the switching temperature $T_{switch}$.

The energy $i^2t$ necessary for this likewise has a minimal value that is predetermined by the current/time characteristic curves of the surge current. The specific energy of the pulse $i^2t_{Transient} = i^2t_{10/350 \mu s, 30 kA}$ should thereby be just insufficient to heat the resistance element R to its switching temperature $T_{switch}$.

For this exemplary pulse the calculation is $i^2t_{Transient} = i^2t_{10/350 \mu s, 30 kA} = 231000 \text{ A}^2\text{s}$. From this estimate a working range results for this exemplary application, which should meet the following conditions:

$$0 \Omega = R_{min} < R \le R_{max} = 50 \text{ m}\Omega \text{ and}$$

$$213000 \text{ A}^2s = i^2t_{Transient} < i^2t_{R,Switch} < i^2t_F = 513000 \text{ A}^2s$$

A working range of this type has not hitherto been usual for PTCs as an example of a resistance element R and is used and implemented by this invention for the first time.

The working range sketched hereby is referenced in FIG. 2 with the reference number 1.

With a PTC of this type as an example of a resistance element R, grid follow currents can be effectively limited without a backup fuse F1, F2 being triggered. This results in an permissible working range for a PTC in which no other application customary in the market operates and can be effectively limited with the grid follow currents without a backup fuse being triggered. The PCT is thereby explicitly adapted to the requirements.

For example wind power: Based on a typical type 1 application in overvoltage protection at wind turbine systems, commercially available surge protection devices SPD must be able to discharge surge current 50000 A of the pulse shape 10/350 µs. The manufacturers stipulate a required backup fuse F1, F2. In the comparable applications customary in the market these are at e.g. I=400 A rated current carrying capacity. The highest permissible protection level is determined by the market and is currently at a maximum of 4500 V.

This results in an $R_{max}$ of:

$$R_{max} = \frac{4500 \text{ V}}{50 \text{ kA}} = 90 \text{ m}\Omega$$

This type of surge protection device SPD would require, for example, a 400 A melt backup fuse F1, F2, which has a fusing integral of approx. $i^2t_F = 859000 \text{ A}^2\text{s}$.

For this example pulse the calculation is $$i^2 t_{Transient} = i^2 t_{10/350\,\mu s, 30\,kA} = 64200\,\text{A}^2\text{s}$$

This value can be calculated, for example, by numerical evaluation of the current/time characteristic curve for this example pulse. From this estimate, a working range results for this exemplary application that should meet the following conditions:

$$0\,\Omega = R_{min} < R \le R_{max} = 90\,\text{m}\Omega$$

and $$642000\,\text{A}^2\text{s} = i^2 t_{Transient} < i^2 t_{R,Switch} < i^2 t_F = 859000\,\text{A}^2\text{s}$$

A working range of this type has hitherto been unusual for PTCs as an example of a resistance element R and is proposed and implemented for the first time with this invention. The working range sketched hereby is referenced in FIG. 2 with the reference number 2. With a PTC of this type as an example of a resistance element R, line follow currents can be effectively limited without a backup fuse F1, F2 being triggered.

Working ranges of other PTCs are shown for comparison in FIG. 2. In FIG. 2 the ordinates thereby show the starting resistance R at a temperature of 20° C. and assigned thereto the specific energies $I^2 t$. The axes are thereby selected logarithmically. Thus reference number 3 shows the working range for typical general surge protection applications, while reference number 4 indicates the working range for surge protection applications in the telecommunications field. Reference number 5 shows the working range of PTCs when used in engine starters, while reference number 6 shows the working range in the case of use as starting surge current limiter or reference number 7 shows the working range in the case of use in switching applications.

It is clearly discernible thereby that the working ranges of classic applications differ markedly from the use in surge protection—as clarified by reference numbers 1 and 2. The resistances to be achieved hereby with a rest temperature of 20° C. are clearly below the resistances of conventional PTCs.

The use of ceramic PTCs as a resistance element is particularly preferred, since these ceramic PTCs in addition have the property that at high applied voltages a varistor effect occurs. This varistor effect promotes a low resistance in the case of surge currents.

A surge protection device SPD according to the present disclosure can thereby have any suitable form of a spark gap SG, such as, e.g., a simple spark gap, an encapsulated spark gap, a spark gap equipped with arc splitters and the like. The spark gap SG can be embodied in a pressure-resistant manner. Furthermore, the surge protection device SPD can also be embodied with a backup fuse F1 as an assembly CD. Moreover, the surge protection device SPD can also be embodied with a backup fuse F2 as a functional unit D. This functional unit can also have a further backup fuse F1.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Additionally, in the appended figures, the following list of reference characters is applicable:
Surge protection device SPD
Spark gap SG
Assembly CD
Functional unit D
Temperature-dependent resistance element R
Backup fuse F1, F2
Power distribution area/power mains 1
Wind power range 2
Overvoltage protection 3
Overvoltage protection telecommunications 4
Engine starter 5
Starting surge current limiter 6
Switching applications 7

What is claimed is:

1. A surge protection device for surge protection in power mains having:
   a spark gap and in series to the spark gap,
   a temperature-dependent resistance element with positive temperature coefficient,
      wherein the spark gap has a certain holding current,
      wherein the resistance element is sized such that when a switching temperature is reached, the current is limited such that the holding current of the spark gap is undercut and is switched off,
      wherein the resistance element is sized such that in the case of a transient event, the switching temperature is not reached,
      wherein the resistance element is sized such that it is heated by a grid follow current following the transient event that has not been extinguished by the spark gap so as to switch off the grid follow current,
      wherein the resistance element is heated up to the switching temperature and the grid follow current following the transient event that has not been extinguished is limited to an uncritical value, and wherein the surge protection device is used on the power main to divert power of a transient event and extinguish the grid follow current.

2. The surge protection device according to claim 1, wherein for heating the resistance element in the transient overvoltage case, the necessary specific energy $i^2(t)_{R,\,switch}$ for achieving the switching temperature is selected larger than the joule integral $i^2(t)_{Transiente}$ of the transient.

3. The surge protection device according to claim 1, wherein the surge protection device is a surge protection device of class 1, 2 or 3 pursuant to IEC61643.

4. The surge protection device according to claim 1, wherein the transient overvoltage is a reference current surge 10/350 µs.

5. The surge protection device according to claim 1, wherein the reference current surge has 10 kA or more of pulse shape 10/350 µs.

6. The surge protection device according to claim 1, wherein the resistance of the resistance element at room temperature is less than or equal to 100 mΩ.

7. The surge protection device according to claim 1, wherein the specific energy $i^2(t)_{R,\,Switch}$ for achieving the switching temperature is greater than 100 A²s.

8. The surge protection device according to one claim 1, wherein the specific energy $i^2(t)_{R,\,switch}$ for achieving the switching temperature is less than 1 MA²s.

9. The surge protection device according to claim 1, wherein the surge protection device furthermore has a backup fuse which is arranged in series to the resistance element or the spark gap.

10. The surge protection device according to claim 1, wherein the resistance element is sized such that during the heating of the resistance element in the transient overvoltage case the necessary specific energy $i^2(t)_{Transiente}$ and the specific energy $i^2(t)_{Powergrid}$ of a grid follow current together is lower than the specific energy i2(t)F which would be necessary for melting the fuse.

11. The surge protection device according to claim 1, wherein the switching temperature is at least 80° C.

12. The surge protection device according to claim 1, wherein the starting resistance of the resistance element is selected such that the sum of the voltages applying in case of discharge at the resistance element, the spark gap and the fuse does not exceed a voltage of 4500 V.

13. The surge protection device according to claim 1, wherein the specific energy $i^2(t)_{R,\ Switch}$ for achieving the switching temperature is greater than 1000 A²s.

14. The surge protection device according to claim 1, wherein the specific energy $i^2(t)_{R,\ Switch}$ for achieving the switching temperature is preferably greater than 100 kA²s.

15. The surge protection device according to claim 1, wherein the switching temperature is preferably 100° C.

16. The surge protection device according to claim 1, wherein the switching temperature is preferably 140° C.

17. The surge protection device according to claim 1, wherein the starting resistance of the resistance element is selected such that the sum of the voltages applying in case of discharge at the resistance element, the spark gap and the fuse does not exceed a voltage of 1500 V.

18. The surge protection device according to claim 1, wherein the starting resistance of the resistance element is selected such that the sum of the voltages applying in case of discharge at the resistance element, the spark gap and the fuse does not exceed a voltage of 1000V.

* * * * *